(12) United States Patent
Geurts et al.

(10) Patent No.: US 9,417,084 B2
(45) Date of Patent: Aug. 16, 2016

(54) METHOD AND NAVIGATION DEVICE FOR PROVIDING AT LEAST ONE ROUTE

(75) Inventors: Lucas Jacobus Franciscus Geurts, Eindhoven (NL); Geert Henricus Maria Christiaansen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/634,265

(22) PCT Filed: Mar. 22, 2011

(86) PCT No.: PCT/IB2011/051185
§ 371 (c)(1),
(2), (4) Date: Sep. 12, 2012

(87) PCT Pub. No.: WO2011/117805
PCT Pub. Date: Sep. 29, 2011

(65) Prior Publication Data
US 2013/0006516 A1    Jan. 3, 2013

(30) Foreign Application Priority Data
Mar. 26, 2010  (EP) .................................... 10157875

(51) Int. Cl.
*G01C 21/34* (2006.01)
*G01C 21/36* (2006.01)

(52) U.S. Cl.
CPC ............ *G01C 21/3617* (2013.01); *G01C 21/34* (2013.01); *G01C 21/343* (2013.01)

(58) Field of Classification Search
CPC .... G01C 21/34; G01C 21/26; G01C 21/3446; G01C 21/32; G01C 21/36; G08G 1/096827

USPC .............. 701/211, 213, 410, 533; 340/995.24
See application file for complete search history.

(56) References Cited

U.S. PATENT DOCUMENTS

| | | | | |
|---|---|---|---|---|
| 6,477,460 B2 * | 11/2002 | Kepler | ......................... | 701/426 |
| 7,353,110 B2 * | 4/2008 | Kim | ........................... | 701/438 |
| 8,019,536 B2 * | 9/2011 | McQuaide, Jr. | .............. | 701/411 |
| 8,204,683 B2 * | 6/2012 | McQuaide, Jr. | .............. | 701/431 |
| 2006/0004512 A1 * | 1/2006 | Herbst et al. | .................. | 701/208 |
| 2006/0129313 A1 | 6/2006 | Becker et al. | | |

(Continued)

FOREIGN PATENT DOCUMENTS

| | | | |
|---|---|---|---|
| JP | 2005233632 A | 9/2005 | |
| JP | 2005351709 A | 12/2005 | |

(Continued)

OTHER PUBLICATIONS

C. Chalvantzis et al: Fuzzy Logic Decisions and Web Servises for a Personalized Geographical Informtion System; New Direct. in Intel Interac. Multimedia., SCI 142, pp. 439-350, 2008.

(Continued)

*Primary Examiner* — Muhammad Shafi
*Assistant Examiner* — Majdi Alsomiri

(57) ABSTRACT

A method and navigation device for providing at least one route is described. A destination is received from a user (step 204). Locations having more than a predetermined amount of content associated therewith are determined (step 206) and locations are selected based on a profile of the user (step 208). At least one route is provided to the destination via at least one location of the determined and selected locations (step 210).

12 Claims, 1 Drawing Sheet

(56) References Cited

U.S. PATENT DOCUMENTS

| | | | |
|---|---|---|---|
| 2007/0016368 A1 | 1/2007 | Chapin et al. | |
| 2007/0067104 A1* | 3/2007 | Mays | 701/211 |
| 2007/0150188 A1* | 6/2007 | Rosenberg | 701/211 |
| 2007/0173956 A1 | 7/2007 | Koch et al. | |
| 2007/0219706 A1 | 9/2007 | Sheynblat | |
| 2008/0082264 A1* | 4/2008 | Hill et al. | 701/213 |
| 2008/0162042 A1 | 7/2008 | Huber et al. | |
| 2009/0085803 A1 | 4/2009 | Mergen | |
| 2009/0182498 A1* | 7/2009 | Seymour | 701/201 |
| 2009/0240427 A1 | 9/2009 | Siereveld et al. | |
| 2009/0240429 A1 | 9/2009 | Tanaka et al. | |

FOREIGN PATENT DOCUMENTS

| | | | |
|---|---|---|---|
| JP | 2006119094 A | 5/2006 | |
| JP | 2007080296 A | 3/2007 | |
| JP | 2011137638 A | 7/2011 | |
| WO | 2009124138 A2 | 10/2009 | |

OTHER PUBLICATIONS

S. Elwood: "Geographic Information Science: new geovisualization technologies-emerging questions and linkages with GIScience research"; Progress in Human Geography 33 (2) (2009), pp. 256-263.

F. Espinoza et al: "Geo Notes: Social and Navigational Aspects of Location-Based Information Systems"; Proceedings of the 3rd International Conference on Ubiquitous Computing, UbiComp '01, pp. 2-17.

A. Goel: "Urban Pilot: A Dynamic Mapping Tool for Personalizing the City through Collective Memory", Proceedings, Fifth International Conference on Information Visualisation, 2001, IEEE, pp. 227-232.

H. Halone et al: "Users Are Doing It for Themselves: Pedestrian Navigation With User Generated Content"; 2007 IEEE, pp. 1-10.

E. Kaasinen: "User Needs for Location-Aware Mobile Services"; Pers Ubiquit Comput (2003) 7, pp. 70-79.

M. H. Krieger et al: "Commentary: Pervasive Urban Media Documentation"; Journal of Planning Education and Research 29, pp. 114-116, 2009 Association of Collegiate Schools of Planning.

Hile et al: "Landmark-Based Pedestrian Navigation From Collections of Geotagged Photos"; Proc. ACM In't'l Conf. Mobile and Ubiquitous Multimedia (MUM), ACM Press, 2008, pp. 145-152.

Hook et al:"Designing Information Spaces: The Social Navigation Approach"; 2003, Springer Publishing, pp. 151-167.

* cited by examiner

METHOD AND NAVIGATION DEVICE FOR PROVIDING AT LEAST ONE ROUTE

FIELD OF THE INVENTION

The present invention relates to a method and navigation device for providing at least one route.

BACKGROUND OF THE INVENTION

With the rise of the mobile internet, more and more content is generated on-the-spot with smart phones like the iPhone or Android phones. This content has a rich quality and includes media items such as pictures and videos, which are geotagged. Also, people are feeding real-time data that is geotagged to services such as twitter indicating what activity they are doing, how they are feeling and where they are.

Another new development is to annotate maps with the emotions of people. The idea is that people geotag how they are feeling automatically or by hand. This creates (city) maps with spots where people feel happy, sad, uncertain, etc. A service called mood mapper offers a filtered map/view of London based on your interests and current mood. By creating an interest profile the points of interest are filtered. Also it offers a mood selector to match points of interest to your current mood.

US 2009/0240429 describes a method for route planning for use with a vehicle navigation system. The method includes the steps of inputting a route origin and route destination on a computer separate from the navigation system. A user inputs activities or points of interest and the computer searches a point of interest database which matches the activities or points of interest inputted by the user. The computer calculates a preferred route from the origin to the route destination. The preferred route, together with data relating to the points of activity, is then wirelessly transmitted to the navigation system for subsequent display on the navigation system screen.

The problem associated with the current navigation systems is that not all people like to explore new places by planning ahead the things that they would like to see or do. Also, current navigation systems calculate routes based on time, distance and fuel usage, for example. Newer systems also take real-time data into account such as traffic congestion, free parking spaces and weather data to suggest alternative routes. In this way, a route to the destination is calculated and, based on this route, preferences of a user are matched with points of interest that can be found along the route and these points of interest are added to the route description. A problem with this system is that only those points of interest that can be found along a specific route are presented to the user, which means that the user may miss an important point of interest if it is not present along this specific route or has not been identified as a point of interest.

SUMMARY OF THE INVENTION

The invention seeks to provide a method and navigation device that provides an easy way for users to explore new places that fit their interests. The invention increases the likelihood of a user discovering, by chance, new things that are interesting to that user.

This is achieved, according to one aspect of the present invention, by a method for providing at least one route, the method comprising the steps of: receiving a destination from a user; determining locations having more than a predetermined amount of content associated therewith; selecting locations based on a profile of the user; and providing at least one route to the destination via at least one location of the determined and selected locations.

This is also achieved, according to a second aspect of the present invention, by a navigation device for providing at least one route the device comprising: a user interface for receiving a destination from a user; a processor for determining locations having more than a predetermined amount of content associated therewith; a filter for selecting locations based on a profile of the user; and an output for providing at least one route to the destination via at least one location of the determined and selected locations.

In this way, a user is presented with the opportunity to visit locations of interest. The locations of interest are provided automatically, which means that the user does not need to carry out any research of the area before travelling. Furthermore, the likelihood of a user discovering, by chance, places of interest is higher.

The content may be user generated content, which may contain text messages, pictures, videos or notes. In this way, content that has been previously generated by users is used to provide an indication of locations that would be of interest to a user, which reduces the input required by the user.

The step of determining locations may comprise determining locations at which more than a predetermined amount of user generated content was generated. In this way, the navigation system is able to determine which locations would be most interesting for the user since users are likely to generate more content at these locations.

The profile of the user may indicate interests of the user. This eliminates the need for the user to continually input their interests into the navigation device since the interests of the user are already stored and can automatically be retrieved by the navigation device to provide an interesting route for the user.

The step of determining locations may comprise: performing a search of content associated with an area based on at least one of current location, current travel direction and destination; and determining locations in the area having more than a predetermined amount of content associated therewith. In this way, the immediate area of the user is searched providing an indication of any locations that are nearby that would be of interest to the user. This enables the navigation device to provide the user with a route with the most reliable indication of places that may be of interest to the user, and which the user would otherwise have missed.

The method may further comprise the step of ranking the searched content, and wherein the step of selecting locations may further comprise selecting locations based on the ranked content. This improves the accuracy of the locations being of interest to the user.

Ranking the searched content may comprise determining a score for a specific location based on at least the amount of content associated with said specific location and the distance between said specific location and the shortest or fastest route and ranking the searched content based on said score. In this way, the user can get to their destination in an efficient way and still see interesting locations. This is based on the insight that users are willing to deviate more from the shortest or fastest route as long as it is worth the extra cost and/or time.

The method may further comprise the step of: providing alternative routes to the user for selection by the user. In this way, a user is able to select their preferred route thereby personalising their experience and providing the user with an ideal route.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION

Figure 1:
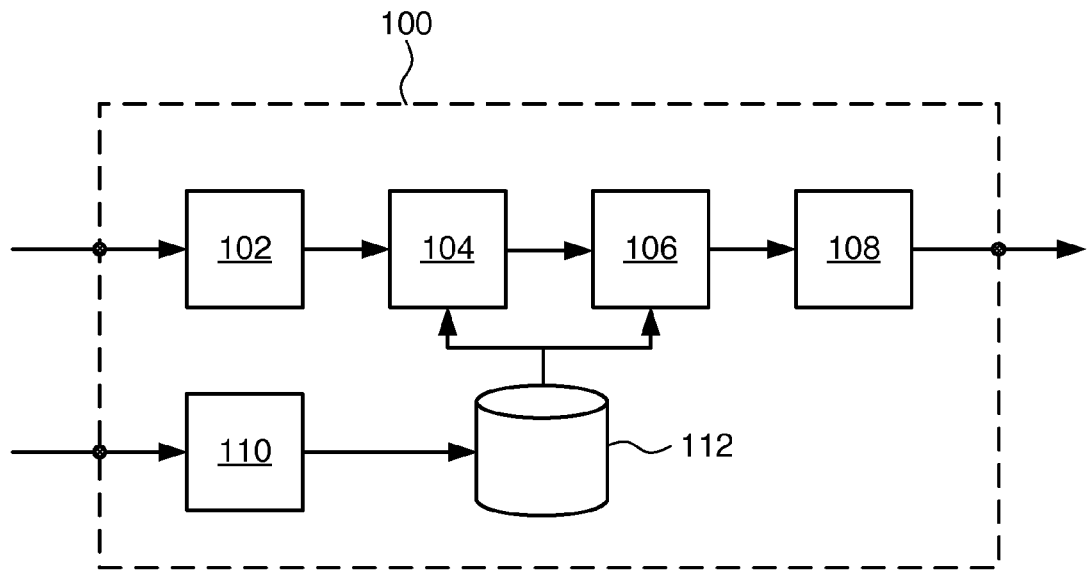
FIG. 1 is a simplified schematic of a navigation device for providing at least one route according to the invention.

With reference to FIG. 1, the navigation device 100 comprises a user interface 102. The output of the user interface 102 is connected to a processor 104. The output of the processor 104 is connected to a filter 106. The output of the filter 106 is connected to an output 108. The navigation device 100 further comprises a recorder 110, the output of which is connected to a storage device 112. The output of the storage device 112 is connected to the processor 104 and the filter 106.

The navigation device 100 may be integrated into a handheld device of a user such as a satellite navigation system, or a mobile phone. Alternatively, the navigation device 100 may be a separate device.

Figure 2:
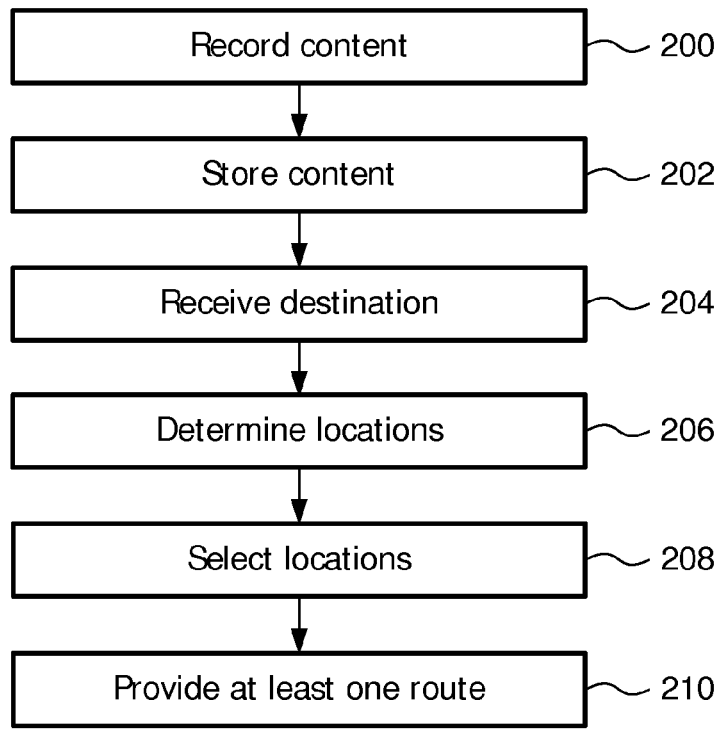
FIG. 2 is a flowchart of a method for providing at least one route according to the invention.

The operation of the apparatus 100 will now be described with reference to the flowchart shown in FIG. 2.

A recorder 110 records content (step 200). The location at which the content is recorded is also noted and associated with the content, for example, by geotagging. The content is stored in the storage device 112 (step 202). The content may be user generated content that contains, for example, text messages, pictures, videos, notes, ratings or reviews of places, which have been recorded by the recorder 110. The recorder 110 may be, for example, a camera in the case of recording pictures or a video camera in the case of recording videos. The content may, alternatively, be uploaded to a storage device outside the navigation device 100, so that other users can download it, e.g. on their navigation devices. In an alternative embodiment, the navigation device 100 does not have a recorder 110 and optionally does not have an internal storage device 112.

A destination is received from a user via the user interface 102 (step 204) and is input into the processor 104.

The processor 104 communicates with the storage device 112 and/or a remote storage device to determine locations having more than a predetermined amount of content associated therewith (step 206). The processor 104 does this by performing a search of content stored in the storage device 112 and/or remote storage device, which is associated with an area based on at least one of the current location of the user, the current travel direction of the user and the received destination, and by determining locations in the area having more than a predetermined amount of content associated therewith.

In the case of user generated content, the processor 104 determines locations having more than a predetermined amount of content associated therewith by determining locations at which more than a predetermined amount of user generated content was generated.

The filter 106 communicates with the storage device 112 and/or remote storage device to select locations based on a profile of the user (step 208). The profile of the user indicates interests of the user. The filter 106 selects the locations by ranking the searched content and selecting locations based on the ranked content.

The filter 106 ranks the searched content using scores that have been determined for each specific location based on at least the amount of content associated with said specific location and the distance between said specific location and the (e.g. nearest point on the) shortest or fastest route. The content associated with a location that is close to the shortest or fastest route to the destination is ranked higher than content at other locations with a comparable amount of content. Alternatively, or additionally, the searched content may be ranked such that newer content gets ranked higher, content of users that have a similar profile gets ranked higher, and/or content of people that the user may know (for example, calculated based on first, second or third degree contacts in linkedIn, etc) gets ranked higher. In this way, content that will be of interest to the user will be ranked higher such that when the user is visiting a city, for example, the user is able to discover places of interest. This is achieved since the content of people who the user knows (friends of the user) or the content of people with a similar profile (or part of a group) is ranked higher and the places to which these people have been in the city being visited by the user are likely to be of interest to the user. The results from this search will be used to highlight hotspots of activity that interest the user. Also the hotspots will be used to create a set of alternative routes that lead the user into areas that fit his interest.

Although the steps of determining locations by the processor 104 and selecting locations by the filter 106 have not been shown and described in a particular order, it is to be noted that the steps can be performed in any order.

For example, in one embodiment, the processor 104 determines locations having more than a predetermined amount of content associated therewith, inputs the determined locations into the filter 106 and the filter 106 selects locations from the determined locations based on a profile of the user. In another embodiment, the filter 106 determines locations based on a profile of the user, inputs the determined locations into the processor 104 and the processor 104 selects locations from the determined locations having more than a predetermined amount of content associated therewith. In a further embodiment, the steps of determining locations and selecting locations are performed simultaneously such that the processor 104 or filter 106 determines locations that have more than a predetermined amount of content associated therewith and match a profile of the user.

The processor 104 inputs the determined locations into the output 108 and the filter 106 inputs the selected locations into the output 108. The output 108 provides at least one route to the destination via at least one location of the determined and selected locations (step 210). The output further provides alternative routes to the user for selection by the user. This is achieved by the output 108 providing the user with alternative directions from the results of the search performed by the processor 104 that lead the user into areas that fit the interests of the user.

For example, if there are different routes that fit the profile of the user such as modern art and live music, the navigation device 100 could suggest two different routes for the user to choose from. Alternatively, the navigation device 100 could suggest a combined route to the user and the interests could be colour coded.

One example of the use of the navigation device 100 is to present hotspots to a user on a map and suggesting/highlighting interesting paths taking into account content generation activity, i.e. taking into account the amount of recently posted content related to a hotspot. In this way, a user is able to find out where things are happening in a city, such as an exhibition or day hotspot activity (for example, where people go out in the evening).

Another example of a use of the navigation device 100 is to navigate a user to a live music event where the user has an interest in such an event. In this example, hotspots presented to a user in a certain colour could be used to show recent activity of people in a city park area in which a live music event is happening. Mobile geotagged internet activity such as mobile blogging or picture uploading record that such an activity is happening. If the user also likes live music, these hotspots are used to offer an alternative route.

Another example of the use of the navigation device 100 is to navigate a user to an art exhibition where the user has an interest in such an event. In this example, the navigation device 100 determines that there is a lot of user generated content in the area of the museum from people that are interested in modern art. The messages generated by the user contain references of modern art and exhibitions and so this topic is placed high in the profile of the user. As this interest topic is high in the profile of the user, the area of the museum is highlighted and the user is navigated to an art exhibition that is currently running at the museum.

Other examples of the use of the navigation device 100 include creating a tour around different pubs based on the pubs in which a user's friends are present, and providing a guide at a large festival event that includes current or upcoming locations of performances from bands in which the user has an interest.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method of providing at least one route for travel from an origin to a destination, the method comprising the acts of:
   providing descriptions for each of a plurality of locations, the description including a number of associated content items;
   on a processor
      receiving the destination from a user;
      selecting a subset of the plurality of locations situated between the origin and the destination based on the number of content items associated with the locations being more than a predetermined number of associated content items;
      ranking the plurality of locations in the selected subset by determining a score for a specific location of the plurality of locations based on the number of content items associated with the specific location and the distance between the specific location and the shortest or fastest route, wherein the ranking is based on the score and the act of selecting the subset is also based on the ranking of the plurality of locations;
      selecting at least one location from the selected subset of the plurality of locations based on preferences for the locations described in a profile of the user; and
      providing the at least one route for travel from the origin to the destination that passes via the selected at least one location.

2. The method according to claim 1, wherein the locations situated between the origin and the destination are determined without regard to any route.

3. The method according to claim 2, wherein the associated content items are user generated content items.

4. The method according to claim 3, wherein the associated content items include text messages, pictures, videos or notes.

5. The method according to claim 1, wherein the user preferences comprise interests of the user.

6. The method according to claim 1, wherein the locations of the subset are situated in an area selected based on at least one of a current location of the plurality of locations, current travel direction and the destination.

7. The method according to claim 1, the method further comprising an act of: providing alternative routes to the destination via the at least one location.

8. A non-transitory computer readable memory medium comprising program code that when executed on a processor performs a method of providing at least one route for travel from an origin to a destination, the method comprising acts of:
   receiving descriptions for each of a plurality of locations, the description including a number of associated content items;
   receiving the destination from a user;
   selecting a subset of the plurality of locations situated between the origin and the destination based on the number of content items associated with the locations being more than a predetermined number of the associated content items;
   ranking the plurality of locations in the selected subset by determining a score for a specific location of the plurality of locations based on the number of content items associated with the specific location and the distance between the specific location and the shortest or fastest route, wherein the ranking is based on the score and the act of selecting the subset is also based on the ranking of the plurality of locations;
   selecting at least one location from the selected subset of the plurality of locations based on preferences for the locations described in a profile of the user; and
   providing the at least one route for travel from the origin to the destination that passes via the selected at least one location.

9. A navigation device for providing at least one route for travel from an origin to a destination, the device comprising:
   a processor configured to
      receive descriptions for each of a plurality of locations, the description including a number of associated content items;
      interact with a user interface for receiving the destination from a user;
      select a subset of the plurality of locations situated between the origin and the destination based on number of content items associated with the locations being more than a predetermined number of associated content items;

rank the plurality of locations in the selected subset by determining a score for a specific location of the plurality of locations based on the number of content items associated with the specific location and the distance between the specific location and the shortest or fastest route, wherein the ranking is based on the score and the selecting the subset is also based on the ranking of the plurality of locations;

utilize a filter for selecting at least one location from the selected subset of the plurality of locations based on preferences for the locations described in a profile of the user; and output the at least one route that passes from the origin to the destination via the selected at least one location.

10. The navigation device according to claim 9, further comprising: a recorder for recording the content items including text messages, pictures, videos or notes.

11. The navigation device according to claim 9, further comprising: a storage device for storing the content items.

12. The navigation device according to claim 9, wherein the at least one route comprises a plurality of routes and the processor is further configured to provide alternative routes from the origin to the destination based on the results of a search for routes performed by the processor.

* * * * *